(12) United States Patent
Andrade

(10) Patent No.: US 10,298,571 B2
(45) Date of Patent: *May 21, 2019

(54) SYSTEMS AND METHODS FOR PROVIDING BLOCK CHAIN-BASED MULTIFACTOR PERSONAL IDENTITY VERIFICATION

(71) Applicant: BLACK GOLD COIN, INC., Las Vegas, NV (US)

(72) Inventor: Marcus Andrade, Fernley, NV (US)

(73) Assignee: BLACK GOLD COIN, INC., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/107,126

(22) Filed: Aug. 21, 2018

(65) Prior Publication Data
US 2019/0007402 A1  Jan. 3, 2019

Related U.S. Application Data

(63) Continuation of application No. 15/966,320, filed on Apr. 30, 2018, now Pat. No. 10,116,657, which is a continuation of application No. 15/083,241, filed on Mar. 28, 2016, now Pat. No. 9,985,964.

(51) Int. Cl.
*H04L 29/06* (2006.01)

(52) U.S. Cl.
CPC .......... *H04L 63/0861* (2013.01); *H04L 63/08* (2013.01); *H04L 29/06* (2013.01); *H04L 63/00* (2013.01); *H04L 2463/082* (2013.01)

(58) Field of Classification Search
CPC ........... H04L 63/0861; H04L 2463/082; H04L 63/08
See application file for complete search history.

(56) References Cited

U.S. PATENT DOCUMENTS

| 2012/0084563 | A1 | 4/2012 | Singhal |
| 2015/0150141 | A1* | 5/2015 | Szymanski ........ G06Q 30/0635 726/26 |
| 2015/0178693 | A1 | 6/2015 | Solis |

(Continued)

OTHER PUBLICATIONS

PCT International Application No. PCT/US2016/024776; International Search Report and Written Opinion, dated Jun. 16, 2016, 7 pages.

*Primary Examiner* — Ellen Tran
(74) *Attorney, Agent, or Firm* — David L. Hoffman; Hoffman Patent Group

(57) ABSTRACT

Block chain-based multifactor personal identity verification may be provided. Verification addresses may be established on a block chain by: associating identifiers with individuals having previously verified personal identities, assigning verification addresses on a block chain to the individuals, and recording identifiers and biometric data associated with the individuals at corresponding verification addresses. Block chain-based multifactor personal identity verification using the verification addresses may be performed by: receiving one or more identifiers in connection with one or more requests to verify an identity of one or more individuals, extracting the biometric data associated with the one or more individuals from the corresponding verification addresses, and verifying the identity of the one or more individuals upon receiving matching biometric data and private keys.

21 Claims, 3 Drawing Sheets

(56) References Cited

U.S. PATENT DOCUMENTS

| | | |
|---|---|---|
| 2015/0356523 A1 | 10/2015 | Madden |
| 2015/0324789 A1 | 11/2015 | Dvorak |
| 2015/0348017 A1* | 12/2015 | Allmen ................ G06Q 20/367 |
| | | 705/76 |
| 2015/0356555 A1 | 12/2015 | Pennanen |
| 2016/0012465 A1* | 1/2016 | Sharp .................... G06Q 20/18 |
| | | 705/14.17 |
| 2017/0091750 A1* | 3/2017 | Maim ................... H04L 9/3236 |

* cited by examiner

SYSTEMS AND METHODS FOR PROVIDING BLOCK CHAIN-BASED MULTIFACTOR PERSONAL IDENTITY VERIFICATION

FIELD OF THE DISCLOSURE

This disclosure relates to systems and methods for providing block chain-based multifactor personal identity verification.

SUMMARY

One aspect of the disclosure relates to a system for providing block chain-based multifactor personal identity verification. The system may include one or more hardware processors configured by machine-readable instructions to establish verification addresses on a block chain and/or perform block chain-based multifactor personal identity verification using the verification addresses. Establishing verification addresses on the block chain may include associating identifiers with individuals having previously verified personal identities, a first identifier being associated a first individual, the first individual having a previously verified personal identity; assigning verification addresses on a block chain to the individuals, a given verification address including a public key and a private key, a first verification address being assigned to the first individual, the first verification address including a first public key and a first private key; and recording identifiers and biometric data associated with the individuals at corresponding verification addresses, the first identifier and first biometric data associated with the first individual being recorded at the first verification address. Performing block chain-based multifactor personal identity verification using the verification addresses may include receiving one or more identifiers in connection with one or more requests to verify an identity of one or more individuals, the first identifier being received in connection with a request to verify an identity of the first individual; extracting the biometric data associated with the one or more individuals from the corresponding verification addresses, the first biometric data associated with the first individual being extracted from the first verification address; and verifying the identity of the one or more individuals upon receiving matching biometric data and private keys, the personal identity of the first individual being verified upon receipt of (1) biometric data matching the first biometric data and (2) a private key matching the first private key.

Another aspect of the disclosure relates to a method for establishing verification addresses on a block chain in order to provide block chain-based multifactor personal identity verification. The method may be performed by one or more hardware processors configured by machine-readable instructions. The method may include associating identifiers with individuals having previously verified personal identities, a first identifier being associated a first individual, the first individual having a previously verified personal identity; assigning verification addresses on a block chain to the individuals, a given verification address including a public key and a private key, a first verification address being assigned to the first individual, the first verification address including a first public key and a first private key; and recording identifiers and biometric data associated with the individuals at corresponding verification addresses, the first identifier and first biometric data associated with the first individual being recorded at the first verification address. The identity of the one or more individuals may be verifiable upon receiving matching biometric data and private keys, such that the personal identity of the first individual is verifiable upon receipt of (1) biometric data matching the first biometric data and (2) a private key matching the first private key.

Yet another aspect of the disclosure relates to a method for perform block chain-based multifactor personal identity verification using verification addresses. The method may be performed by one or more hardware processors configured by machine-readable instructions. The method may include receiving one or more identifiers in connection with one or more requests to verify an identity of one or more individuals, a first identifier being received in connection with a request to verify an identity of a first individual; extracting biometric data associated with the one or more individuals from corresponding verification addresses on a block chain, a given verification address including a public key and a private key, first biometric data associated with the first individual being extracted from a first verification address assigned to the first individual, the first verification address including a first public key and a first private key; and verifying the identity of the one or more individuals upon receiving matching biometric data and private keys, the personal identity of the first individual being verified upon receipt of (1) biometric data matching the first biometric data and (2) a private key matching the first private key.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
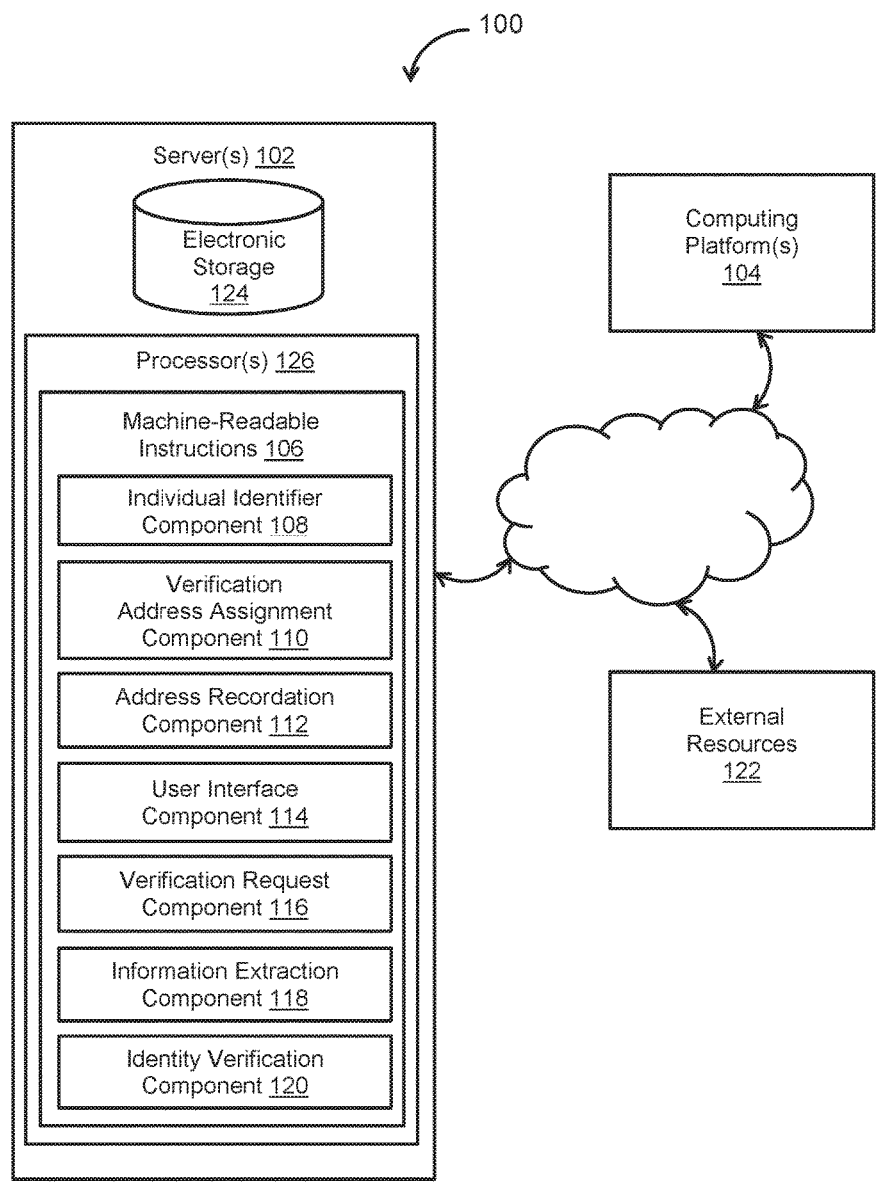
FIG. 1 illustrates a system for providing block chain-based multifactor personal identity verification, in accordance with one or more implementations.

FIG. 1 illustrates a system 100 for providing block chain-based multifactor personal identity verification, in accordance with one or more implementations. In some implementations, system 100 may include one or more servers 102. The server(s) 102 may be configured to communicate with one or more computing platforms 104 according to a client/server architecture, a peer-to-peer architecture, and/or other architectures. The users may access system 100 via computing platform(s) 104.

The server(s) 102 may be configured to execute machine-readable instructions 106. The machine-readable instructions 106 may include one or more of an individual identifier component 108, a verification address assignment component 110, an address recordation component 112, a user interface component 114, a verification request component 116, an information extraction component 118, an identity verification component 120, and/or other machine-readable instruction components.

The machine-readable instructions 106 may be executable to establish verification addresses on a block chain. Generally speaking, a block chain is a transaction database shared by some or all nodes participating in system 100. Such participation may be based on the Bitcoin protocol, Ethereum protocol, and/or other protocols related to digital currencies and/or block chains. A full copy of the block chain contains every transaction ever executed in an associated digital currency. In addition to transactions, other information may be contained by the block chain, such as described further herein.

The block chain may be based on several blocks. A block may include a record that contains and confirms one or more waiting transactions. Periodically (e.g., roughly every one minute), a new block including transactions and/or other information may be appended to the block chain. In some implementations, a given block in the block chain contains a hash of the previous block. This may have the effect of creating a chain of blocks from a genesis block (i.e., the first block in the block chain) to a current block. The given block may be guaranteed to come chronologically after a previous block because the previous block's hash would otherwise not be known. The given block may be computationally impractical to modify once it is included in the block chain because every block after it would also have to be regenerated.

A given verification address may include a specific location on the block chain where certain information is stored. In some implementations, an individual verification address may be referred to as an "AtenVerify Address." Verification addresses are further described below in connection with verification address assignment component 110.

The individual identifier component 108 may be configured to associated identifiers with individuals having previously verified personal identities. For example, a first identifier may be associated a first individual. The first individual may have a previously verified personal identity. Generally speaking, an identifier may include one or more of a number, an alphanumeric code, a username, and/or other information that can be linked to an individual. In some implementations, an individual identifier may be referred to as an "Aten ID."

In accordance with some implementations, an individual having a previously verified personal identity may have obtained the previously verified personal identity through a variety of approaches. For example, in some implementations the individual may be required to provide evidence of the individual's identity. Such evidence may include one or more of providing a copy of a government issued identification (e.g., passport and/or driver's license), providing a copy of mail received by the individual (e.g., a utility bill), evidence provided by a third party, and/or other evidence on an individual's identity. The evidence may be provided to an entity associated with server(s) 102.

The verification address assignment component 110 may be configured to assign verification addresses on a block chain to the individuals. A given verification address may include a public key and a private key. By way of example, a first verification address may be assigned to the first individual. The first verification address may include a first public key and a first private key.

Generally speaking, a public and private key-pair may be used for encryption and decryption according to one or more public key algorithms. By way of non-limiting example, a key pair may be used for digital signatures. Such a key pair may include a private key for signing and a public key for verification. The public key may be widely distributed, while the private key is kept secret (e.g., known only to its proprietor). The keys may be related mathematically, but calculating the private key from the public key is unfeasible.

In some implementations, verification address assignment component 110 may be configured such that private keys may be stored within computing platform(s) 104. For example, the first private key may be stored within a computing platform 104 and/or other locations associated with the first individual. In accordance with some implementation, a private key may be stored in one or more of a "verify.dat" file, a SIM card, and/or other locations.

In some implementations, verification address assignment component 110 may be configured such that multiple verification addresses may be assigned to separate individuals. For example, in addition to the first verification address, a second verification address may be assigned to the first individual. One or more additional verification addresses may be assigned to the first individual, in accordance with one or more implementations.

The address recordation component 112 may be configured to record identifiers and biometric data associated with the individuals at corresponding verification addresses. For example, the first identifier and first biometric data associated with the first individual may be recorded at the first verification address. Recording information at a given verification address may include recording a hash or other encrypted representation of the information. In some implementations, different biometric data may be recorded at multiple verification addresses assigned to a single given individual. For example, in addition to the first identifier and the first biometric data associated with the first individual being recorded at the first verification address, the first identifier and second biometric data associated with the first individual may be recorded at a second verification address.

Generally speaking, biometric data may include metrics related to human characteristics. Biometric identifiers are distinctive, measurable characteristics that can be used to label and describe individuals. Biometric identifiers are typically include physiological characteristics, but may also include behavioral characteristics and/or other characteristics. Physiological characteristics may be related to the shape of an individual's body. Examples of physiological characteristics used as biometric data may include one or more of fingerprint, palm veins, face recognition, DNA, palm print, hand geometry, iris recognition, retina, odor or scent, and/or other physiological characteristics. Behavioral characteristics may be related to a pattern of behavior of an individual. Examples of behavioral characteristics used as biometric data may include one or more of typing rhythm, gait, voice, and/or other behavioral characteristics.

The biometric data may include one or more of an image or other visual representation of a physiological characteristic, a recording of a behavioral characteristic, a template of a physiological characteristic and/or behavioral characteristic, and/or other biometric data. A template may include a synthesis of relevant features extracted from the source. A template may include one or more of a vector describing features of a physiological characteristic and/or behavioral characteristic, a numerical representation of a physiological characteristic and/or behavioral characteristic, an image with particular properties, and/or other information.

Biometric data may be received via computing platforms 104 associated with the individuals. For example, biometric data associated with a first individual may be received via a first computing platform 104 associated with the first individual. The first computing platform 104 may include an input device (not depicted) configured to capture and/or record a physiological characteristic and/or behavioral characteristic of the first individual. Examples of such an input device may include one or more of a camera and/or other imaging device, a fingerprint scanner, a microphone, an accelerometer, and/or other input devices.

The user interface component 114 may be configured to provide an interface for presentation to individuals via associated computing platforms 104. The interface may include a graphical user interface presented via individual computing platforms 104. According to some implementations, the interface may be configured to allow a given individual to add or delete verification addresses assigned to the given individual so long as at least one verification address is assigned to the given individual.

In some implementations, user interface component 114 may be configured to access and/or manage one or more user profiles and/or user information associated with users of system 100. The one or more user profiles and/or user information may include information stored by server(s) 102, one or more of the computing platform(s) 104, and/or other storage locations. The user profiles may include, for example, information identifying users (e.g., a username or handle, a number, an identifier, and/or other identifying information), security login information (e.g., a login code or password), system account information, subscription information, digital currency account information (e.g., related to currency held in credit for a user), relationship information (e.g., information related to relationships between users in system 100), system usage information, demographic information associated with users, interaction history among users in the system 100, information stated by users, purchase information of users, browsing history of users, a computing platform identification associated with a user, a phone number associated with a user, and/or other information related to users.

The machine-readable instructions 106 may be executable to perform block chain-based multifactor personal identity verification using the verification addresses.

The verification request component 116 may be configured to receive one or more identifiers in connection with one or more requests to verify an identity of one or more individuals. For example, the first identifier may be received in connection with a request to verify an identity of the first individual. Requests for identity verification may be provided in connection with and/or related to financial transactions, information exchanges, and/or other interactions. Requests may be received from other individuals and/or other third parties.

The information extraction component 118 may be configured to extract the biometric data associated with the one or more individuals from the corresponding verification addresses. For example, the first biometric data associated with the first individual may be extracted from the first verification address. Extracting information (e.g., biometric data) from a verification address may include decrypting information.

According to some implementations, information extraction component 118 may be configured such that, responsive to receiving the request to verify the identity of the first individual, a prompt may be provided to the first individual for biometric data matching the first biometric data and a private key matching the first private key. The prompt may be conveyed via a computing platform 104 associated with the first individual. The prompt may be conveyed via a graphical user interface and/or other user interface provided by the computing platform 104 associated with the first individual. The prompt may include an indication that is one or more of visual, audible, haptic, and/or other indications.

In some implementations, information extraction component 118 may be configured such that, responsive to receiving the request to verify the identity of the first individual, a prompt may be provided to a computing platform 104 associated with the first individual. The prompt may cause the computing platform 104 to automatically provide, to server(s) 102, biometric data matching the first biometric data and/or a private key matching the first private key.

The identity verification component 120 may be configured to verify the identity of the one or more individuals upon, or in response to, receiving matching biometric data and private keys. For example, the personal identity of the first individual may be verified upon receipt of (1) biometric data matching the first biometric data and (2) a private key matching the first private key. Verifying the personal identity of the first individual may include comparing stored information with newly received information.

According to some implementations, identity verification component 120 may be configured such that the personal identity of the first individual may be verified upon receipt of (1) biometric data matching the first biometric data or the second biometric data and (2) a private key matching the first private key. Such implementations may provide so-called "M-of-N" signatures for identity verification where some subset of a larger set of identifying information is required.

In some implementations, identity verification component 120 may be configured such that the biometric data matching the first biometric data and the private key matching the first private key may be used to sign the verification of the personal identity of the first individual.

A cryptographic signature is a mathematical mechanism that allows someone to prove ownership. In the case of Bitcoin, a Bitcoin wallet and its private key(s) are linked by some mathematical magic. When your Bitcoin software signs a transaction with the appropriate private key, the whole network can see that the signature matches the bitcoins being spent. However, there is no way for the world to guess your private key to steal your hard-earned bitcoins.

In some implementations, at least one dedicated node performs the signing of the verification of the personal identity of the first individual. A given dedicated node may include one or more of the server(s) 102. The given dedicated node may be a public node or a private node configured for creating new blocks and/or for signing verification.

In some implementations, server(s) 102, computing platform(s) 104, and/or external resources 122 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, computing platform(s) 104, and/or external resources 122 may be operatively linked via some other communication media.

A given computing platform 104 may include one or more processors configured to execute machine-readable instructions. The machine-readable instructions may be configured to enable an expert or user associated with the given computing platform 104 to interface with system 100 and/or external resources 122, and/or provide other functionality attributed herein to computing platform(s) 104. By way of non-limiting example, the given computing platform 104 may include one or more of a desktop computer, a laptop computer, a handheld computer, a tablet computing platform, a NetBook, a Smartphone, a gaming console, and/or other computing platforms.

External resources 122 may include sources of information, hosts and/or providers of virtual environments outside of system 100, external entities participating with system 100, and/or other resources. In some implementations, some or all of the functionality attributed herein to external resources 100 may be provided by resources included in system 100.

Server(s) 102 may include electronic storage 124, one or more processors 126, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 124 may comprise non-transitory storage media that electronically stores information. The electronic storage media of electronic storage 124 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 124 may include one or more virtual storage resources (e.g., cloud storage, a virtual private network, and/or other virtual storage resources). Electronic storage 124 may store software algorithms, information determined by processor(s) 126, information received from server(s) 102, information received from computing platform(s) 104, and/or other information that enables server(s) 102 to function as described herein.

Processor(s) 126 may be configured to provide information processing capabilities in server(s) 102. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. The processor(s) 126 may be configured to execute machine-readable instruction components 108, 110, 112, 114, 116, 118, 120, and/or other machine-readable instruction components. Processor(s) 126 may be configured to execute machine-readable instruction components 108, 110, 112, 114, 116, 118, 120, and/or other machine-readable instruction components by software; hardware; firmware; some combination of software, hardware, and/or firmware; and/or other mechanisms for configuring processing capabilities on processor(s) 126. As used herein, the term "machine-readable instruction component" may refer to any component or set of components that perform the functionality attributed to the machine-readable instruction component. This may include one or more physical processors during execution of processor readable instructions, the processor readable instructions, circuitry, hardware, storage media, or any other components.

It should be appreciated that although machine-readable instruction components 108, 110, 112, 114, 116, 118, and 120 are illustrated in FIG. 1 as being implemented within a single processing unit, in implementations in which processor(s) 126 includes multiple processing units, one or more of machine-readable instruction components 108, 110, 112, 114, 116, 118, and/or 120 may be implemented remotely from the other machine-readable instruction components. The description of the functionality provided by the different machine-readable instruction components 108, 110, 112, 114, 116, 118, and/or 120 described below is for illustrative purposes, and is not intended to be limiting, as any of machine-readable instruction components 108, 110, 112, 114, 116, 118, and/or 120 may provide more or less functionality than is described. For example, one or more of machine-readable instruction components 108, 110, 112, 114, 116, 118, and/or 120 may be eliminated, and some or all of its functionality may be provided by other ones of machine-readable instruction components 108, 110, 112, 114, 116, 118, and/or 120. As another example, processor(s) 126 may be configured to execute one or more additional machine-readable instruction components that may perform some or all of the functionality attributed below to one of machine-readable instruction components 108, 110, 112, 114, 116, 118, and/or 120.

Figure 2:
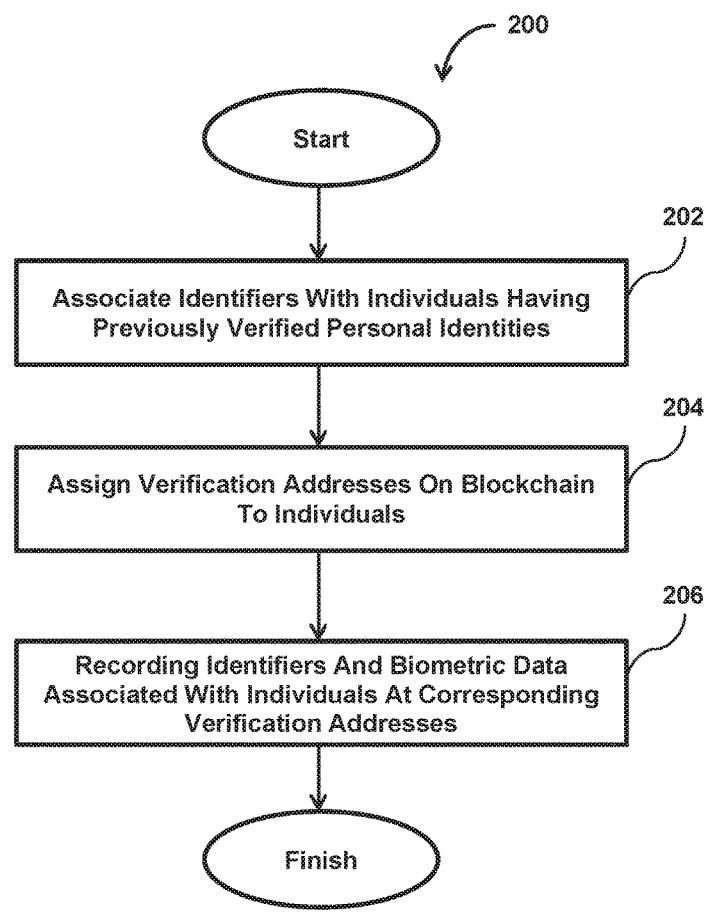
FIG. 2 illustrates a method for establishing verification addresses on a block chain in order to provide block chain-based multifactor personal identity verification, in accordance with one or more implementations.

FIG. 2 illustrates a method 200 for establishing verification addresses on a block chain in order to provide block chain-based multifactor personal identity verification, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, one or more operations of method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, identifiers may be associated with individuals having previously verified personal identities. A first identifier may be associated a first individual. The first individual may have a previously verified personal identity. Operation 202 may be performed by one or more hardware processors configured to execute a machine-readable instruction component that is the same as or similar to individual identifier component 108 (as described in connection with FIG. 1), in accordance with one or more implementations.

At an operation 204, verification addresses on a block chain may be assigned to the individuals. A given verification address may include a public key and a private key. A first verification address may be assigned to the first individual. The first verification address may include a first public key and a first private key. Operation 204 may be performed by one or more hardware processors configured to execute a machine-readable instruction component that is the same as or similar to verification address assignment component 110 (as described in connection with FIG. 1), in accordance with one or more implementations.

At an operation 206, identifiers and biometric data associated with the individuals may be recorded at corresponding verification addresses. The first identifier and first biometric data associated with the first individual may be recorded at the first verification address. The identity of the one or more individuals may be verifiable upon, or in response to, receiving matching biometric data and private keys. The personal identity of the first individual may be verifiable upon, or in response to, receipt of (1) biometric data matching the first biometric data and (2) a private key matching the first private key. Operation 206 may be performed by one or more hardware processors configured to execute a machine-readable instruction component that is the same as or similar to address recordation component 112 (as described in connection with FIG. 1), in accordance with one or more implementations.

Figure 3:
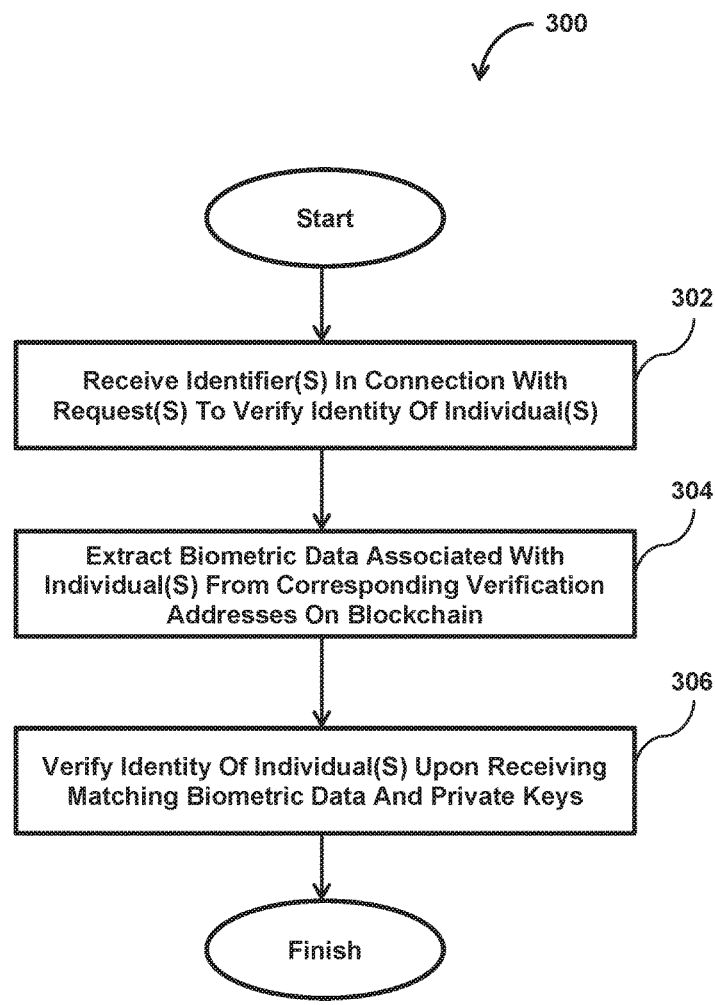
FIG. 3 illustrates a method for performing block chain-based multifactor personal identity verification using verification addresses, in accordance with one or more implementations.

FIG. 3 illustrates a method 300 for performing block chain-based multifactor personal identity verification using verification addresses, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, one or more identifiers may be received in connection with one or more requests to verify an identity of one or more individuals. A first identifier may be received in connection with a request to verify an identity of a first individual. Operation 302 may be performed by one or more hardware processors configured to execute a machine-readable instruction component that is the same as or similar to verification request component 116 (as described in connection with FIG. 1), in accordance with one or more implementations.

At an operation 304, biometric data associated with the one or more individuals may be extracted from corresponding verification addresses on a block chain. A given verification address may include a public key and a private key. First biometric data associated with the first individual may extracted from a first verification address assigned to the first individual. The first verification address may include a first public key and a first private key. Operation 304 may be performed by one or more hardware processors configured to execute a machine-readable instruction component that is the same as or similar to information extraction component 118 (as described in connection with FIG. 1), in accordance with one or more implementations.

At an operation 306, the identity of the one or more individuals may be verified upon, or in response to, receiving matching biometric data and private keys. The personal identity of the first individual may be verified upon, or in response to, receipt of (1) biometric data matching the first biometric data and (2) a private key matching the first private key. Operation 306 may be performed by one or more hardware processors configured to execute a machine-readable instruction component that is the same as or similar to identity verification component 120 (as described in connection with FIG. 1), in accordance with one or more implementations.

Exemplary implementations may facilitate storing personal data on the block chain. The personal data may be stored on the block chain in an encrypted way. A person may be identified at the block chain level with one or more of a private key, a finger print, a finger print hash, an eye retina, an eye retina hash, and/or other unique information. The data stored may include or relate to one or more of a passport, an identification card, extracted passport information, a driver's license, extracted driver's license information, finger print, eye retina, and/or other information. According to some implementations, if some of the data is changed, a new record may be created for that person in the block chain. That is, all changes are added as new records. The old record will always be stored on the block chain. Generally speaking, all records on the block chain are stored forever and cannot be removed. More than one copy of the block chain will exist to ensure the records are not manipulated.

Exemplary implementations may facilitate access to personal data. There may be multiple access levels for the personal data in the block chain. Access controls may be grated on public/private key pairs levels. Examples of access levels may include one or more of Super Admin (full access to block chain), Authorities-country level (full read-only access), Authorities-state/local level (limited read-only access), Police and other services including Emergency (access to certain personal data by Finger Print/Eye retina of that person only), Participating Merchants (limited access), and/or other access levels.

Exemplary implementations may facilitate verification check. There may be multiple levels for how it is possible to check verification. For example, some implementations may ensure a person has a record at "Company" but no personal data is provided. Some implementations may ensure a person has a record at Company and get very basic personal information such as Full Name, DOB, Gender, and/or other basic information. Some implementations may ensure a person has a record at Company and get all personal data.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing blockchain-based personal identity verification, the system comprising:
one or more computer-readable storage media configured to store a blockchain;
a computer system comprising one or more processors programmed to execute computer program instructions that, when executed, cause the computer system to:
assign a verification address associated with the blockchain to an individual, the individual having a previously verified personal identity, wherein the verification address is a specific location on the blockchain where information is stored, and wherein the verification address is derived from a public key contained in a public and private key-pair;
store, at the one or more computer-readable storage media, an identifier of the individual and biometric information of the individual in association with the verification address associated with the blockchain, at least the biometric information being stored at the specific location on the blockchain, wherein the biometric information is derived from biometric data of the individual;
obtain, from a client-side device, a received identifier and one or more of received biometric data and received biometric information in connection with a request to verify the individual's identity, the request indicating the verification address associated with the blockchain;
obtain the stored identifier and the stored biometric information using the verification address indicated in the request, wherein at least the stored biometric information is obtained from the specific address on the blockchain; and
sign verification of the individual's identity responsive to a determination that the received identifier matches the stored identifier, and one or more of:
(i) derived biometric information derived from the received biometric data matches the stored biometric information, and
(ii) the received biometric information matches the stored biometric information,
assign a second verification address associated with the blockchain to the individual, wherein the second verification address is a second specific location on the blockchain where information is stored;
store, at the one or more computer-readable storage media, second biometric information of the individual in association with the second verification address associated with the blockchain, the second biometric information derived from second biometric data of the individual, the second biometric information being stored at the second specific location on the blockchain;
obtain, from the client-side device, one or more of second received biometric data and second received biometric information in connection with the request to verify the individual's identity, the request further indicating the second verification address associated with the blockchain;
obtain the second stored biometric information using the second verification address indicated in the request; and
sign the verification of the individual's identity responsive to a determination that the identifier of the request matches the stored identifier and one or more of:
(i) derived biometric information derived from the received biometric data matches the stored biometric information and second derived biometric information derived from the second received biometric data matches the second stored biometric information, and
(ii) the received biometric information matches the stored biometric information and the second received biometric information matches the second stored biometric information;
wherein the second biometric information is different from the biometric information and wherein the second specific location on the blockchain is different from the specific location on the blockchain.

2. The system of claim 1, wherein the server-side computer system is caused to:
obtain, via a user interface, a user-initiated command to add the second verification address as an address of the blockchain for the individual; and
assign the second verification address associated with the blockchain to the individual based on the user-initiated command.

3. The system of claim 1, wherein the computer system is caused to:
obtain, via a user interface, a user-initiated command to remove the second verification address as an address of the blockchain for the individual; and
de-associate the second verification address associated with the blockchain from the individual based on the user-initiated command.

4. The system of claim 1, wherein the computer system is caused to:
in the step of storing, store the identifier at the specific location on the blockchain corresponding to the verification address;
in the step of obtaining the stored identifier and the stored biometric information using the verification address indicated in the request, obtain the identifier from the blockchain at the verification address;
in the step of storing, store the second identifier at the second specific location on the blockchain corresponding to the second verification address;
in the step of obtaining the stored second identifier and the stored second biometric information using the second verification address indicated in the request, obtain the second identifier from the blockchain at the second verification address.

5. The system of claim 1, wherein the computer system is caused to:
in the step of storing, store at least the biometric information as a new transaction record on the blockchain at the specific location on the blockchain; and
in the step of storing, store at least the second biometric information as another new transaction record on the blockchain at the second specific location on the blockchain.

6. The system of claim 5, wherein the computer system is caused to:
in the step of storing, store the new transaction record linked to a previous transaction record by a hash of the previous transaction record.

7. The system of claim 1, wherein the signing step utilizes the private key of the public and private key-pair from which the verification address was derived, and the second private key of the second public and second private key-pair from which the second verification address was derived.

8. The system of claim 1, wherein the biometric data is related to a fingerprint, palm veins, face recognition, DNA, palm print, hand geometry, iris recognition, retina, odor, gait, or voice, wherein the biometric information and the identifier are different from each other.

9. The system of claim 1, wherein the computer system is caused to:
prior to the step of storing, use the processor or processors to initially verify the individual's identity by use of government issued identification of the individual.

10. A system for providing blockchain-based personal identity verification, the system comprising:
one or more computer-readable storage media configured to store a blockchain; and
a computer system comprising one or more processors programmed to execute computer program instructions that, when executed, cause the computer system to:
assign multiple verification addresses of the blockchain to the individual, the individual having a previously verified personal identity, the multiple verification addresses comprising a first verification address associated with the blockchain and a second verification address associated with the blockchain, wherein the first verification address provides a first specific location on the blockchain and the second verification address provides a second specific location on the blockchain;
store, at the one or more computer-readable storage media:
(i) a first identifier of the individual and first biometric information of the individual in association with the first verification address associated with the blockchain at the first specific location on the blockchain and
(ii) second identifier and second biometric information of the individual in association with the second verification address associated with the blockchain at the second specific location on the blockchain,
wherein the first biometric information is derived from first biometric data of the individual, and the second biometric information is derived from second biometric data of the individual, and
wherein the first verification address is different from the second verification address, the first verification address is derived from the first public key of the first public and private key-pair, and the second verification address is derived from the second public key of the second public and private key-pair;
obtain, from a client-side device, a first received identifier, one or more of first received biometric data and first received biometric information, a second identifier and one or more of second received biometric data and second received biometric information in connection with a request to verify the individual's identity, the request indicating the first verification address associated with the blockchain and the second verification address associated with the blockchain;
obtain:
(i) the stored first identifier and the stored first biometric information from the blockchain using the first verification address indicated in the request, and
(ii) the stored second identifier and the stored second biometric information from the blockchain using the second verification address indicated in the request; and
sign, using the private key from which the first verification address was derived and using the private key from which the second verification address was derived, verification of the individual's identity responsive to a determination that the first received identifier matches the first stored identifier, the second received identifier matches the second stored identifier, one or more of:
first derived biometric information derived from the first received biometric data matches the first stored biometric information and
second derived biometric information derived from the second received biometric data matches the second stored biometric information, and
the first received biometric information matches the first stored biometric information and the second received biometric information matches the second stored biometric information, provide a first user, different than the individual, access to data stored at the one or more computer-readable storage media in association with the first verification address associated with the blockchain, the first user being provided access to the stored data based on verification that the first user has a first private key, the first private key being different the private key from which the first verification address was derived and different from the private key from which the second verification address was derived; and
deny a second user, different than the individual, access to the stored data based on verification that the second user has a second private key.

11. The system of claim 10, wherein the computer system is caused to:
in the step of storing the first and second identifiers, store the identifier at the first and second specific locations on the blockchain corresponding to the first and second verification addresses, respectively; and
in the step of obtaining the stored first identifier and the stored first biometric information, obtain the first stored identifier and the stored first biometric information using the first verification address indicated in the request, and
in the step of obtaining the stored second identifier and the stored second biometric information, obtain the stored second identifier and the stored second biometric information using the second verification address indicated in the request.

12. The system of claim 10, wherein the computer system is caused to: in the step of storing, at the one or more computer-readable storage media, store at least the first biometric information as a first new transaction record on the blockchain at the first specific location on the blockchain and store at least the second biometric information as a second new transaction record on the blockchain at the second specific location.

13. The system of claim 10, wherein the computer system is caused to:
in the step of storing,
store the first identifier and the first biometric information as a first new transaction record on the blockchain at the first specific location on the blockchain, and
store the second identifier and the second biometric information as a second new transaction record on the blockchain at the second specific location on the blockchain.

14. The system of claim 12, wherein the computer system is caused to:
in the step of storing,
store the first new transaction record linked to a first previous transaction record by a hash of the previous transaction record and
store the second new transaction record linked to a second previous transaction.

15. The system of claim 13, wherein the computer system is caused to:
in the step of storing,
store the first new transaction record linked to a first previous transaction record by a first hash of the first previous transaction record, and
store the second new transaction record linked to a second previous transaction record by a second hash of the second previous transaction record.

16. The system of claim 10, wherein the computer system is caused to:
in the step of storing,
store the first biometric information as a hash of the first biometric data, and
store the second biometric information as a hash of the second biometric data.

17. The system of claim 11, wherein the stored first biometric information is a hash of the first biometric data and the stored second biometric information is a hash of the second biometric data.

18. The system of claim 10, wherein the identifier and the first biometric information and the second biometric information are each different from each other.

19. The system of claim 10, wherein the computer system includes a server-side computer.

20. A system for providing blockchain-based personal identity verification, the system comprising one or more hardware processors configured by machine-readable instructions to:
establish verification addresses on a blockchain by:
associating identifiers with individuals having previously verified personal identities, a first identifier being associated with a first individual, the first individual having a previously verified personal identity;
assigning verification addresses on a blockchain to the individuals, a given verification address including a public key and a private key, a first verification address being assigned to the first individual, the first verification address including a first public key and a first private key, wherein the first verification address is a first specific location on the blockchain where information is stored; and
recording identifiers and biometric information associated with the individuals at corresponding verification addresses, the first identifier and first biometric information associated with the first individual being recorded at the first verification address, at least the first biometric information being stored at the first specific location on the blockchain; and
perform blockchain-based personal identity verification using the verification addresses by:
receiving one or more identifiers in connection with one or more requests to verify an identity of one or more individuals, the first identifier being received in connection with a request to verify an identity of the first individual;
extracting the biometric information associated with the one or more individuals from the corresponding verification addresses, the first biometric information associated with the first individual being extracted from the first verification address from the first specific location on the blockchain;
obtaining, from a client-side device, identifiers and one or more of biometric data and biometric information in connection with a request to verify the identity of one or more individuals, the request indicating the verification address or addresses associated with the blockchain; and
verifying the identity of the one or more individuals upon receiving matching biometric data or biometric information and private keys, the personal identity of the first individual being verified upon receipt of a received private key matching the first private key and one or more of:
(i) derived biometric information derived from the received biometric data matching the first biometric information and
(ii) received biometric information matching the first biometric information.

21. The system of claim 20, wherein the step of verifying the first individual's identity further requires the received identifier matching the recorded first identifier, and wherein the computer system is caused to:
in the step of storing the first and second identifiers, store the identifier at the first and second specific locations on the blockchain corresponding to the first and second verification addresses, respectively; and
in the step of obtaining the stored first identifier and the stored first biometric information, obtain the first stored identifier and the stored first biometric information using the first verification address indicated in the request, and
in the step of obtaining the stored second identifier and the stored second biometric information, obtain the stored second identifier and the stored second biometric information using the second verification address indicated in the request.

* * * * *